United States Patent [19]

La See

[11] 4,383,516
[45] May 17, 1983

[54] BOW FISHING REEL

[76] Inventor: Jack La See, 308 W. Cedar St., Abbotsford, Wis. 54405

[21] Appl. No.: 252,928

[22] Filed: Apr. 10, 1981

[51] Int. Cl.³ .............................................. F41B 5/00
[52] U.S. Cl. ........................................ 124/88; 124/80
[58] Field of Search ................. 124/24 R, 80, 86, 88, 124/23 R; 43/6, 19; 226/181–191

[56] References Cited

U.S. PATENT DOCUMENTS 2,670,926  3/1954  Sewell et al. ...................... 226/186
3,949,730  4/1976  Schoenberger .................. 124/24 R

FOREIGN PATENT DOCUMENTS 77272  9/1918  Austria ............................... 226/183

Primary Examiner—Richard C. Pinkham
Assistant Examiner—William R. Browne

[57] ABSTRACT

A fishing reel for an archery bow has a housing which is attachable to the center portion of a bow. The housing mounts a pair of rollers, one of which is geared to a crank handle and the other of which is mounted on a pivotable trigger lever. A line attached to an arrow extends between the rollers and is stored loosely in a bottle mounted on the housing. The trigger lever is actuated by a finger of the archer's hand which holds the bow to pinch the line between the rollers for retrieval upon turning of the hand crank, or to release the line so as to enable the line to move freely out of the bottle.

4 Claims, 5 Drawing Figures

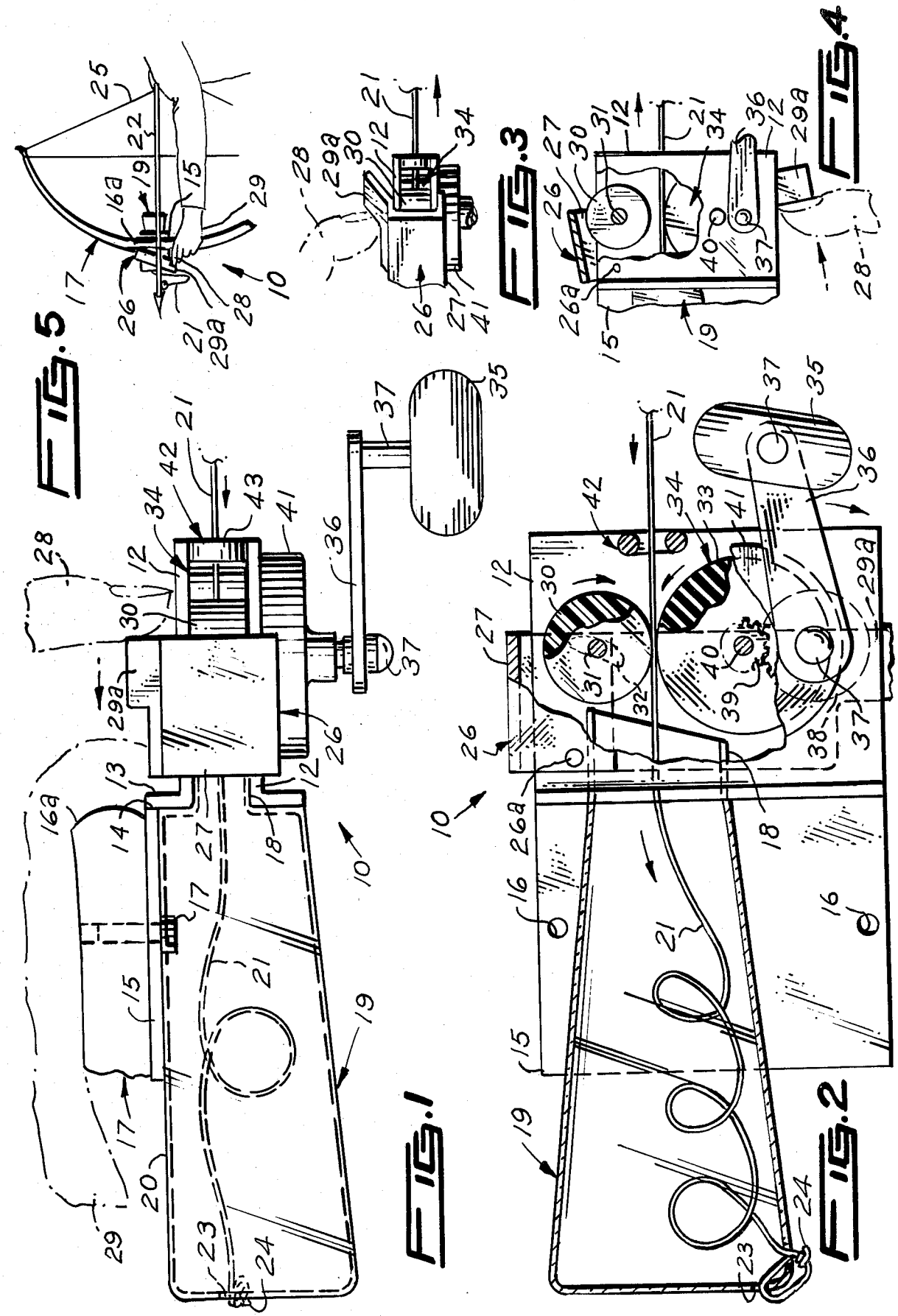

BOW FISHING REEL

This invention relates to archery devices, and more particularly, to a bow fishing reel.

It is, therefore, the principal object of this invention to provide a bow fishing reel, which will enable a sportsman to retrieve a fishing arrow, which has been shot, when bow fishing.

Another object of this invention is to provide a bow fishing reel, which will enable the archer to retrieve his arrow approximately ten times faster than the hand-wound reels of the prior art, and the reel will have excellent line control, thus, eliminating the possibility of the line's tangling.

Another object of this invention is to provide a bow fishing reel, which will have virtually no drag on its line, so as not to alter the flight of the arrow.

A further object of this invention is to provide a bow fishing reel, which will be safe in use, as compared to the spinning-type reels, as are used by some sportsmen for bow fishing.

Other objects of the present invention are to provide a bow fishing reel, which is simple in design, inexpensive to manufacture, rugged in construction, easy to use and efficient in operation.

These, and other objects, will be readily evident, upon a study of the following specification, and the accompanying drawing, wherein:

FIG. 1 is a top plan view of the present invention, showing the bow fragmentary, and illustrating the user's finger pulling the trigger level of the reel;

FIG. 2 is a fragmentary side elevational view of FIG. 1, showing the forward portion of the reel partly broken away;

FIG. 3 is a fragmentary view of FIG. 1, shown on a smaller scale, and illustrating the trigger lever of the reel being urged forward by the user's finger, so as to lift the top roller of the device, which will enable the line to be free, for being carried by the bowman's arrow;

FIG. 4 is a fragmentary view of FIG. 2, shown on a smaller scale, and illustrating the top roller free of the line, with the user's finger urging the trigger lever forward, to do so, and FIG. 5 is a rear side view of FIG. 2, shown on a much smaller scale, and illustrates the archer's finger holding the trigger lever forward, prior to releasing an arrow from his bow, which is shown fragmentary.

According to this invention, a reel 10 is shown to include a pair of spaced-apart plates 12, of suitable material. Plates 12 are "L"-shaped in configuration, and the lip 13, of one plate 12, is fixedly secured to a longitudinal side edge 14 of a rectangular mounting plate 15, and plate 15 includes a pair of spaced-apart and aligned openings 16, which receive suitable fasteners 17, for mounting to the center portion 16a of a typical archer's bow 17, as may be more clearly seen in FIG. 5 of the drawing. The neck portion 18, of a plastic bottle 19, is fixedly secured between the plates 12 at the lip portions 13, and bottle 19 is also, preferably, secured, at one of its side surfaces 20, to plate 15, in a suitable manner (not shown). One end of a fishing line 21 is suitably secured to a fishing arrow 22, as illustrated in FIG. 5, and the opposite end of line 21 is received in openings 23, in the rear of bottle 19, where it is suitably secured by knot 24 means, so as to prevent loss of the line 21 and the arrow 22, when the arrow leaves the bowstring 25.

A trigger lever 26 includes a "U"-shaped upper end 27, which is freely received on the upper ends of plates 12, and a pivot pin 26a extends through end 27, and is suitably secured in plates 12, so as to enable trigger lever 26 to pivot, by means of the user's finger 28 of his hand 29, which grips the bow 17. Trigger lever 26 includes a projection 29a, for easy accommodation of the user's finger 28, so as to operate reel 10, in a manner which hereinafter will be described.

A nylon roller 30 is rotatably received on a shaft 31, which is fixedly secured, in a suitable manner, within the "U"-shaped end of trigger lever 26. The shaft 31 is, also, freely received in the arcuate slots 32, through plates 12. When trigger lever 26 is in its downward position, roller 30 urges line 21 against the outer periphery 33 of rubber roller 34, so as to enable the user to retrieve line 21 into bottle 19 quickly by the knob 35 and crank handle 36 means. Knob 35 is pivotally secured to pin 37, in one end of crank handle 36, and crank handle 36 is fixedly secured to rotatable shaft 37, having a gear 38 fixedly secured thereto. Gear 38 meshes with gear 39, which is fixedly secured to shaft 40, that carries roller 34, and the gears 38 and 39 are contained within housing 41, which is suitably secured to the outside face of one of plates 12, the aforementioned gearing and cranking arrangement being common in the art.

It shall be noted, that a line guide ring 42 is fixedly secured, in a suitable manner, at its outer periphery 43, to the inside surfaces of plates 12, for unhindered travel of line 21 in both directions.

In use, reel 10 piles or stacks the line 21 in the bottle 19. Line 21 is retrieved by pinching it between the plastic roller 30, of trigger lever 26, and the rubber roller 34. Before the arrow is shot, the trigger lever 26 is pushed forward, as illustrated in FIGS. 3 and 4, pivoting roller 30 upwards, and away from line 21, so as to enable line 21 to feed freely out of its bottle 19, and follow the arrow 22. In retrieving arrow 22, trigger lever 26 is pulled back, which will pivot roller 30 downwards, so as to pinch line 21 against the outer periphery 33 of roller 34, and the crank handle 36, having speed-up gearing, consisting of gears 38 and 39, will drive the rubber roller at high speed, which will pull line 21, so as to feed it into the bottle 19, enabling line 21 to be ready for the next shot.

It shall also be noted, that reel 10 is much safer, in use, than "spinning" reels, because, if the user forgets to release the line of such reels, the line will either break, or the arrow will stretch the line, and recoil, striking the shooter. The line of reel 10 is not wound on a spool, thus, there is no twisting of line 21.

It shall further be recognized, that reel 10 can handle more and heavier line 21, such as two hundred feet of number seventy woven line.

While various changes may be made in the detail construction, it is understood that such changes will be within the spirit and scope of the present invention, as is defined by the appended claims.

What I now claim is:

1. A fishing reel for an archer's bow, comprising:
 a pair of parallel spaced-apart plates;
 a mounting plate secured to one of said pair of plates for securing said reel to an archer's bow;
 a bottle secured to said pair of plates for removably receiving a line which is removably secured to a forward portion of an arrow;
 a pair of rollers mounted between said pairs of plates for providing a means of releasing a line for following the flight of an arrow and providing a means of retrieving a line with the attached arrow;

one of said pair of rollers being driven, gearing connecting said one roller to a hand crank secured to one of said pair of plates;

the other of said pair of rollers being mounted on a finger operated trigger lever secured pivotably to said pair of plates, for releasing said other of said rollers from a line for freedom of travel of a line and its attached arrow, said trigger lever also serving as a means of pinching a line to said roller driven to said gearing;

one of said pair of plates being fixedly secured at one longitudinally side edge to one longitudinal side edge of said mounting plate, and said mounting plate includes a pair of spaced-apart openings, which removably received screw fasteners, for securing said reel to the center side portion of an archer's bow;

the second of said pair of plates having a gear box housing fixedly secured to its outer face for receiving said gearing; and the neck of said bottle being fixedly secured between said pair of plates, and the closed end of said bottle including a pair of spaced-apart openings, through which one end of a line may be received and knotted.

2. The combination according to claim 1, wherein an open guide ring, for freely receiving said line, is fixedly secured, at its outer periphery, to the inside surfaces of said pair of plates at the forward end of said reel, and a pivot pin is secured across and between said pair of plates, and pivotally receives the upper end of said trigger lever, which is "U"-shaped in configuration, and is freely received over the upper ends of said pair of plates of said reel, and the lower extremity of said trigger lever includes a projection, for being urged by a finger of the user, forwardly and rearwardly, to operate said reel.

3. The combination according to claim 2, wherein the other of said pair of rollers is rotatably received on a pin fixedly secured across, and within, said "U"-shaped upper end of said trigger lever, so as to urge said line against said one of said pair of rollers, which is of resilient material, for rolling and frictional engagement with said line, to enable the user to rotate said hand crank, to drive said one of said pair of rollers, to retrieve said line back into said bottle, after said arrow is shot.

4. A fishing reel for an archery bow, comprising:

a pair of spaced-apart plates;

mounting means for securing one of said plates to a bow;

a bottle connected to the plates and adapted to receive, through its mouth, a line secured to an arrow and to store a line loosely within the bottle;

a first roller mounted between said plates on a shaft;

drive means for said first roller including a hand crank and gearing connecting said hand crank to the shaft of said first roller; and a finger operated trigger lever pivotally mounted on said plates;

a second roller mounted on said lever and movable as said lever is pivoted toward said first roller to pinch a line therebetween and away from the first roller to release a line, said trigger lever being so positioned that it can be actuated by a finger on the hand of the archer which grips a bow.

* * * * *